Nov. 18, 1941.   R. D. BEAN ET AL   2,262,790
CONTROL APPARATUS
Filed Aug. 2, 1940   2 Sheets-Sheet 1

INVENTOR.
ROSCOE D. BEAN
HARRY S. JONES
BY
ATTORNEY

Nov. 18, 1941.    R. D. BEAN ET AL    2,262,790
CONTROL APPARATUS
Filed Aug. 2, 1940    2 Sheets-Sheet 2
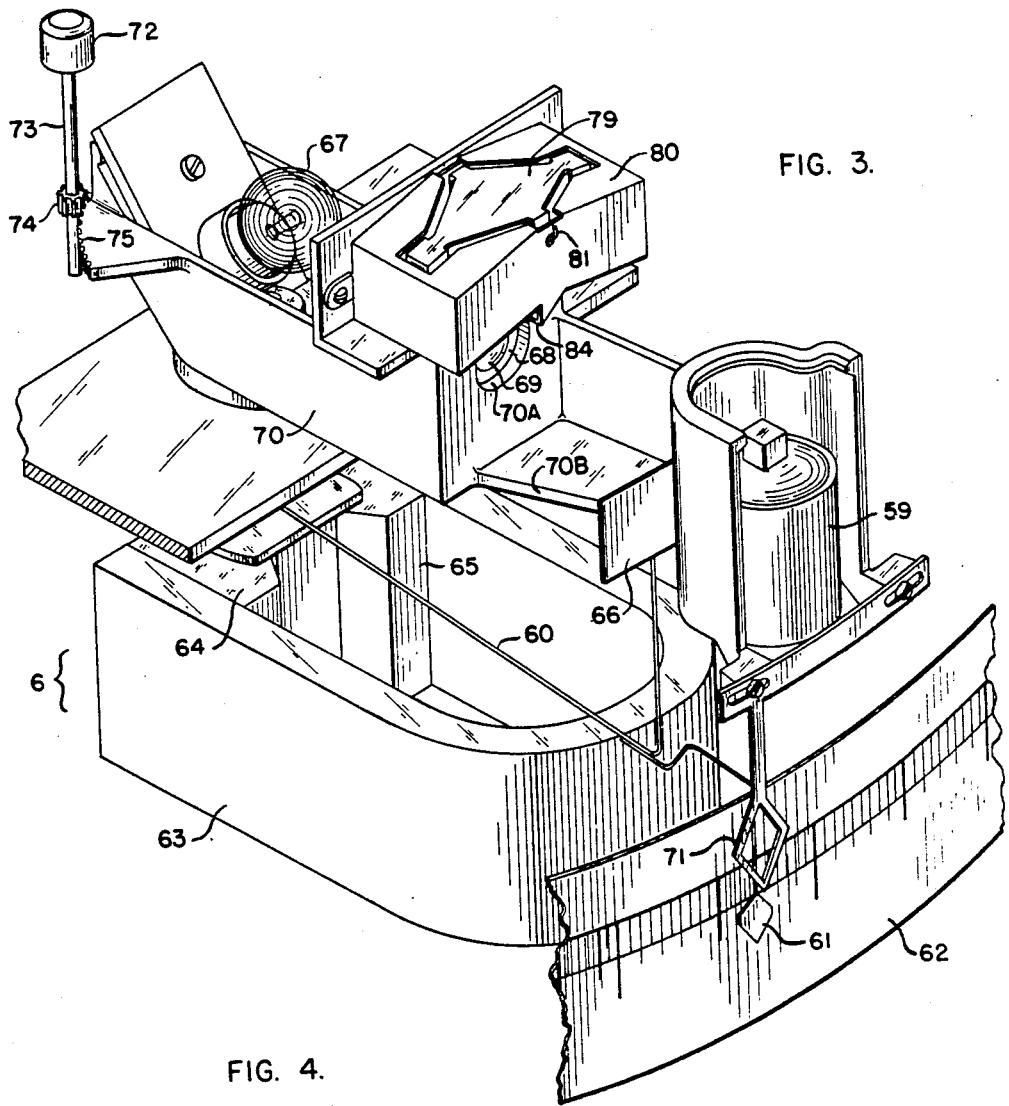
FIG. 3.
FIG. 4.
INVENTOR.
ROSCOE D. BEAN
HARRY S. JONES
BY 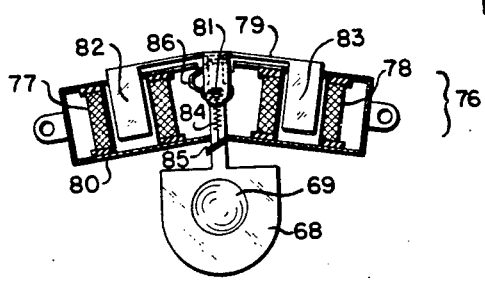
ATTORNEY Patented Nov. 18, 1941

2,262,790

UNITED STATES PATENT OFFICE 2,262,790

CONTROL APPARATUS

Roscoe D. Bean, Ambler, and Harry S. Jones, Philadelphia, Pa., assignors to The Brown Instrument Company, Philadelphia, Pa., a corporation of Pennsylvania Application August 2, 1940, Serial No. 349,994

19 Claims. (Cl. 250—41.5)

The present invention relates to automatic control apparatus, and more particularly, to automatic control apparatus of the follow-up type which is adapted to effect proportional control of the supply of a condition varying agent in response to the fluctuations of a variable condition to maintain said condition at a predetermined, desired value.

An object of the invention is to provide automatic control apparatus of the type referred to above wherein the primary controlling element is a highly sensitive and delicate device for effecting whose actuation only very weak forces are available.

Another object of the invention is to provide automatic control apparatus of the type referred to above wherein the primary controlling element is a highly sensitive device having a delicate actuating member, and wherein adjustments of the controlled device for regulating the supply of condition varying agent are effected in response to actuation of said delicate actuating member without retarding the movement of the latter and thereby reducing the sensitiveness of the primary controlling element. By imposing no work on the primary controlling element, precision of its actuation is insured.

A further object of the invention is to provide automatic control apparatus of the type referred to above wherein the primary controlling element is a highly sensitive device of extremely delicate nature, and wherein the means controlled thereby for effecting adjustments in the supply of condition varying agent is a rugged power driven device for which full driving power is available on small changes in the actuation of said primary controlling element.

A specific object of the invention is to provide automatic temperature control apparatus of the follow-up type which is adapted to effect stepless or proportional control of the supply of a temperature varying agent under control of a highly sensitive measuring device, such, for example, as a pyrometer responsive to the temperature variations of a region whose temperature it is desired to maintain constant and for effecting whose actuation only a weak electric current is available.

A still further object of the invention is to provide automatic control apparatus of the type referred to above which is relatively simple and rugged in construction.

In the prior art, automatic control devices adapted to effect stepless or proportional regulations of the supply of a condition varying agent in accordance with the extent of deflection of a primary controlling element have been limited to arrangements wherein the primary controlling element is quite rugged and where considerable power for the operation of that element is available, or have been limited to arrangements wherein only a small fraction of full power for the controlled device which effects adjustments in the supply of condition varying agent is available on small changes in the actuation of the primary controlling element. In accordance with the present invention full power for the controlled device which adjusts the supply of condition varying agent is available on small changes in the actuation of a primary controlling element, the latter of which may be extremely sensitive and delicate in nature.

In the preferred form of the invention, provisions are included for readily effecting a so-called "throttling range" adjustment whereby the extent to which the controlled device or fuel valve is adjusted in response to a given change in furnace temperature or other control quantity may be varied.

The preferred form of the invention also includes provisions for effecting a so-called "reset" adjustment whereby on a change in an operating condition, such, for example, as a change in the load on a furnace which is being controlled to minimize variations in the furnace temperature, the tendency of the furnace load or other operating condition to increase or decrease the furnace temperature or other condition under control may be neutralized.

The invention disclosed and claimed herein is of especial utility for use in an automatic control system in which the value of the condition under control is measured by a sensitive galvanometer, having a delicate deflecting member, constituting the primary controlling element of the control system.

The various features of novelty which characterize our invention are pointed out with particularity in the claims annexed to and forming a part of this specification. For a better understanding of the invention, however, its advantages and specific objects attained with its use, reference should be had to the accompanying drawings and descriptive matter in which we have illustrated a preferred embodiment of the invention.

Of the drawings:

Fig. 3 is a preferred structural view of the optical system of Fig. 1;

Fig. 4 is a detail view of a portion of Fig. 3; and

Figures 1, 2, 5:
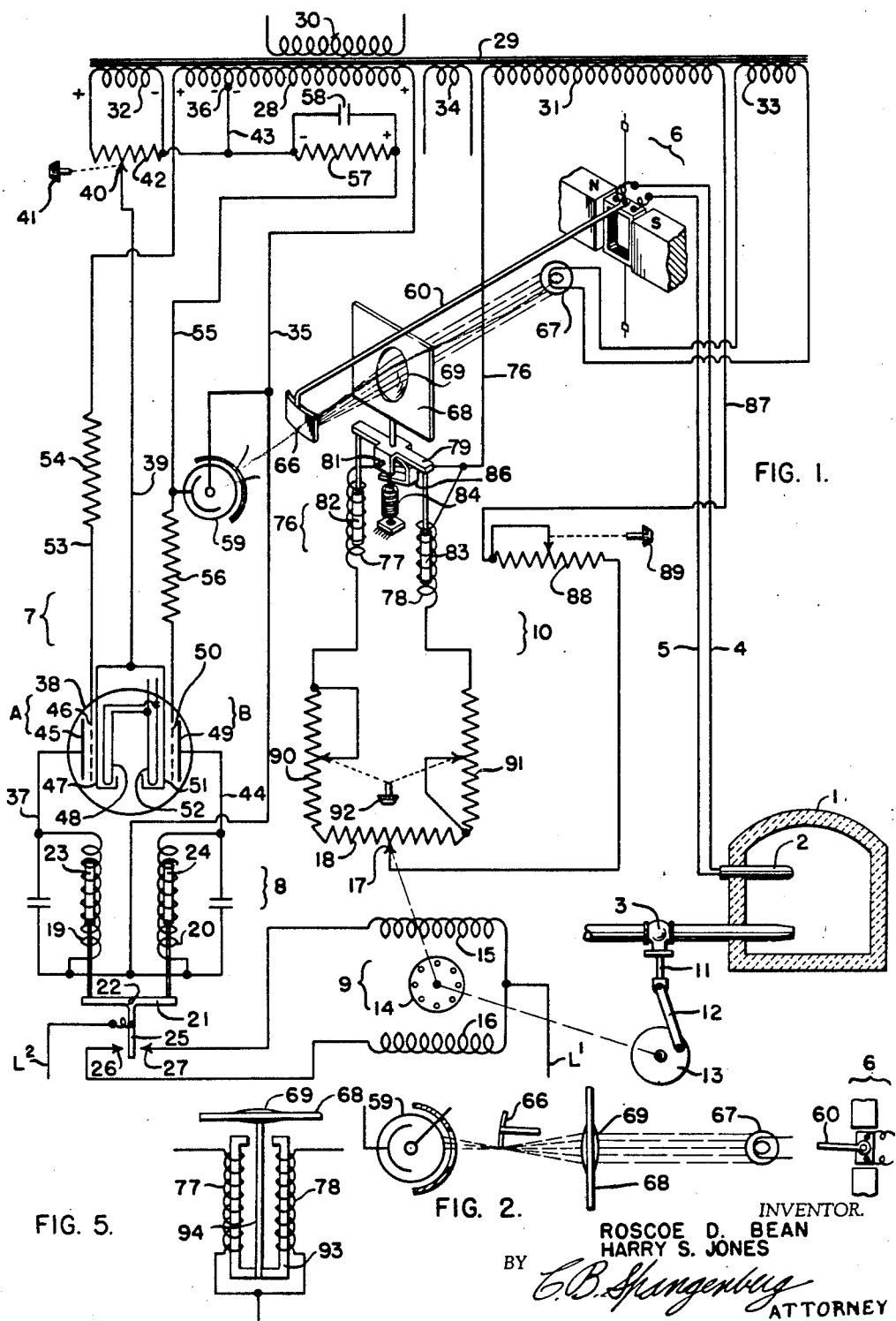
Fig. 1 is a diagrammatic representation of a preferred embodiment of our invention.
Fig. 2 is a top view of the optical system of Fig. 1.
Fig. 5 illustrates a modification of the Fig. 4 arrangement.

While the follow-up control system of our present invention may be utilized for controlling the value of any variable condition such as temperature, pressure, flow, liquid level, etc., it is disclosed in the drawings, for purposes of illustration, as controlling a temperature condition, and more particularly, the temperature within the interior of a furnace 1 to which a thermocouple 2 is responsive. The supply of heating agent or fuel to the furnace is controlled by a valve 3 which is adapted to be adjusted in a plurality of positions under control of the thermocouple 2 and thereby in response to changes in the temperature within the furnace 1.

The thermocouple 2 is connected by conductors 4 and 5 to the terminals of the movable coil of a suspension type galvanometer indicated generally at 6. The galvanometer 6 is a highly sensitive measuring instrument capable of responding to extremely weak electric current flows in the conductors 4 and 5, and is utilized in accordance with our invention to control the selective actuation of an electric circuit indicated generally at 7. The manner in which the galvanometer 6 is utilized for effecting such control is illustrated diagrammatically in Figs. 1 and 2. A preferred arrangement for effecting such control is illustrated in Figs. 3 and 4.

The electric circuit 7, in turn, controls the selective actuation of a relay 8 and thereby controls the operation of a reversible electrical motor 9. The motor 9 positions the valve 3 and also operates a follow-up arrangement designated at 10. The follow-up arrangement 10, in turn, controls the operation of the circuit 7 and relay 8, providing a true follow-up control system.

Valve 3 is shown as operated by a stem 11 which is connected by a pitman 12 to a crank disc 13 carried by the shaft of motor 9, which shaft is indicated by the dotted line. The motor shaft is operated through a reduction gear train (not shown) by motor rotor 14. The rotor 14 is selectively controlled for rotation in one direction or the other by field windings 15 and 16, the arrangement being such that when only the field winding 15 is energized, valve 3 is adjusted towards its open position, and when only the field winding 16 is energized, the valve 3 is moved toward its closed position.

The shaft of motor 9 is also operatively connected with a contact 17 which is disposed in engagement with a slidewire resistance 18, and is adapted to adjust that contact along the length of the resistance 18 whenever it operates to adjust the position of valve 3. The contact 17 and slidewire resistance 18 are connected in the follow-up arrangement 10 referred to hereinbefore, and for convenience will hereinafter be referred to as the follow-up potentiometer. When the valve 3 is adjusted toward its open position, the contact 17 is moved toward the right.

The relay generally designated at 8 includes a pair of coils 19 and 20 which are disposed in operative relation with a balanced armature 21. Armature 21 is pivoted for rotation at 22, a point intermediate its ends, and carries an iron core 23 at one end, which core is adapted to move into and out of coil 19, and carries an iron core 24 at the other end, which core is adapted to move into and out of the coil 20. Armature 21 also carries a switch blade 25 which is disposed between a pair of stationary contacts 26 and 27. When the coils 19 and 20 are equally energized, the switch blade 25 is held intermediate and out of engagement with both of the contacts 26 and 27, but when one of the coils 19 or 20 is energized to a greater extent than the other, the switch blade is moved into engagement with the contact 27 or 26, respectively.

Electrical power is adapted to be supplied the reversible motor 9 through the switch blade 25 and contacts 26 and 27 of relay 8 from alternating current supply conductors L¹ and L². As illustrated, the right ends of the field windings 15 and 16 of motor 9 are connected together and to the supply conductor L¹. The other end of the field winding 15 is connected to the contact 27 and the other end of the field winding 16 is connected to the contact 26. The switch blade 25 of relay 8 is connected to the supply conductor L² so that on deflection of the switch blade into engagement with the contact 26, energizing current is supplied the field winding 16 to produce rotation of the rotor 14 in one direction, and on deflection of the switch blade into engagement with the contact 27, energizing current is supplied the field winding 15 to produce rotation of the rotor 14 in the opposite direction.

Electric power is supplied the relay 8 under control of the circuit 7, referred to hereinbefore, from the high voltage secondary winding 28 of a transformer 29 having a line voltage primary winding 30 connected to the alternating voltage supply conductors L¹ and L², and secondary windings 31, 32, 33, and 34. To this end the lower terminals of relay coils 19 and 20 are connected together and are connected by a common conductor 35 to the right end terminal of the secondary winding 28. The upper terminal of relay coil 19 is connected to a tap 36 intermediate the terminals of winding 28 through a circuit which may be traced from said upper terminal to a conductor 37, the anode to cathode resistance of the triode section A of a twin type electronic valve 38 which also includes a triode section B, a conductor 39 to a tap 40, which is adjustable by a knob 41 along a slidewire resistance 42, resistance 42, and a conductor 43 to the tap 36 on transformer secondary winding 28. As shown, the transformer secondary winding 32 is connected across the terminals of the resistance 42. It is noted the portion of the secondary winding 28 to the left of the tap 36 is so wound with respect to the rest of the winding and with respect to the secondary winding 32 that the polarities of the voltages during one half cycle are as shown. The upper terminal of relay coil 20 is connected to the tap 36 on winding 28 through a circuit including a conductor 44, the anode to cathode resistance of the triode B of valve 38, the conductor 39, tap 40, resistance 42, and conductor 43.

When the triode sections A and B of valve 38 are equally conductive, the relay coils 19 and 20 are energized to the same extent and consequently the relay switch arm 25 will be held in an intermediate position out of engagement with both of the contacts 26 and 27, but when one triode section A or B is more conductive than the other, the relay coil 19 or 20 will be energized to a greater extent depending upon which triode section is more conductive.

As illustrated, the triode section A includes an anode 45, a control grid 46, a cathode 47, and a heating filament 48. The triode section B similarly includes an anode 49, a control grid 50, a cathode 51 and a heating filament 52. The heating filaments 48 and 52 may be connected in parallel as shown and receive energizing current through conducting leads, not shown in order not to confuse the drawings, from the transformer secondary winding 34. Anode voltage is supplied the triode sections A and B through the energizing circuits traced above for the relay coils 19 and 20.

The grid circuit for the triode A may be traced from the grid 46 to a conductor 53, in which a current limiting resistance 54 is inserted to the left end terminal of winding 28, tap 36, conductor 43, resistance 42, tap 40, and conductor 39 to the cathode 47. It is noted the winding 32 and the portion of winding 28 to the left of tap 36 are so phased as to oppose each other, the winding 32 tending to render the grid 46 negative with respect to cathode 47 during the half cycle when the anode 45 is positive and the portion of winding 28 referred to tending to render the grid 46 positive with respect to cathode 47 during that same half cycle. Whether the grid 46 is at the same potential as cathode 47 or positive or negative with respect thereto is determined by the adjustment of contact 40 along resistance 42. It is noted the potential of grid 46 is substantially constant during the normal operation of the system.

The grid circuit of the triode B may be traced from the grid 50 to a conductor 55, in which a current limiting resistance 56 and a resistance 57 shunted by a condenser are inserted, to the resistance 42, tap 40 and conductor 39 to the cathode 51. The potential of grid 50 relatively to cathode 51 is adapted to be varied in accordance with the illumination of a photoelectric cell 59. The photoelectric cell 59 may desirably be of the electron emissive type and is connected between the right end terminals of transformer secondary winding 28 and resistance 57. The current conducted by cell 59 passes through resistance 57 so that a potential drop is established across the latter, the magnitude of which potential drop depends upon the illumination of the photoelectric cell 59. The cell 59 is so connected in the circuit that the polarity of the potential drop established is that shown. The energizing circuit for cell 59 may be traced from the right end terminal of winding 28 to conductor 35, cell 59, conductor 55, resistance 57, and conductor 43 to the tap 36 on winding 28. The illumination of cell 59 is controlled by the galvanometer 6 in response to variations of the temperature within the furnace 1 by means which are described hereinafter.

The adjustable resistance 42 is included in a connection which is common to the grid circuits of both triode sections A and B so that adjustment thereof operates to simultaneously change the potentials of the grids 46 and 50 relatively to their associated cathodes. It is noted that adjustment of the contact 40 in the direction to include more of the resistance 42 in circuit is effective to render the grids more negative with respect to their associated cathodes while adjustment of the contact 40 in the opposite direction is effective to render the grids less negative with respect to their associated cathodes. The contact 40 desirably is adjusted so as to suit the characteristics of the triode sections A and B to thereby establish the most efficient operating conditions.

As noted hereinbefore, the illumination of photoelectric cell 59 and thereby the selective actuation of relays 19 and 20 is controlled by the galvanometer 6, the latter of which in turn is responsive to changes in the electromotive force produced by thermocouple 2 and thereby is responsive to the temperature variations within furnace 1. To this end the galvanometer 6 is provided with a pointer or needle 60 which is carried by the movable coil thereof as illustrated diagrammatically in Fig. 1 and in more detail in Fig. 3 which is a preferred embodiment of our invention. An index 61 which is disposed in cooperative relation with a scale 62 is mounted on the end of pointer 60.

As illustrated in Fig. 3, the galvanometer 6 includes a U-shaped permanent magnet 63 provided with pole faces 64 and 65 between which the movable coil of the galvanometer is suspended by a suspension wire (not shown) in a well-known manner. A light aluminum vane 66 which is impervious to light is disposed on the end of the pointer 60. The galvanometer 6 is so arranged with respect to the photoelectric cell 59 and with respect to a source of light, such as a lamp 67, that the vane 66 is adapted to be motivated into and out of the path of the light impinging on photoelectric cell 59 in accordance with the deflections of the movable coil thereof and thereby in accordance with the furnace temperature variations. The lamp 67 is connected to and receives energizing current from the transformer secondary winding 33.

As illustrated, an opaque plate 68, in which a focussing lens 69 is mounted, is also positioned between the photoelectric cell 59 and lamp 67, and the optical system is so arranged that the only light from lamp 67 which is permitted to impinge on cell 59 is that which is transmitted by the lens 69. The lens 69 and the length of the galvanometer pointer 60 are so proportioned that the vane 66 is adapted to move into the path of the light impinging on cell 59 at the point of focus on the lens 69. Thus, a slight movement of the vane 66 in one direction or the other is sufficient to fully illuminate the cell 59 or to cut off all of the light thereto. In accordance with our present invention, the position of the shield 68 and lens 69 is adjustable by a solenoid arrangement described hereinafter.

In the preferred embodiment of our invention, the photoelectric cell 59, the lamp 67 and the lens 69 are carried by a rotatable casting 70 which is pivoted for rotation at the left end thereof as seen in Fig. 3. The axis of rotation of the casting 70 is parallel to and is in direct alignment with the axis of rotation of the galvanometer moving coil. The lamp 67 is so positioned that the bulb thereof is in direct alignment with said axes of rotation.

The casting 70 carries an index 71 at the other end thereof, which index is disposed in cooperative relation with the scale 62. The galvanometer pointer 60 and the vane 66 are so arranged with respect to the casting 70 and index 71 that when the temperature of the furnace 1 is the desired value, the index 71 will be directly above the index 61 along the scale 62. By adjusting the position of the index 71 along the scale 62, the temperature maintained in the furnace 1, may be controlled as desired. In the embodiment illustrated in Fig. 3 such adjustment is readily effected by manipulation of a knob 72 which is carried on the upper end of a shaft 73. The shaft 73 is mounted in suitable bearings, not shown, and carries a gear 74 which is rigid therewith. The gear 74 is in operative engagement with a circular rack 75, which rack is formed on the end of and is integral with the casting 70. The center of the arc of the circular rack 75 coincides with the axis of rotation of casting 70 so that on rotation of the knob 72 in one direction or the other, clockwise or counter-clockwise movement of the casting 70 is effected.

In the normal operation of the system the triode sections A and B of valve 38 are equally conductive when the illumination of the photoelectric cell 59 is a predetermined value. Under this condition, the relay coils 19 and 20 are equally energized and consequently the motor 9 is not actuated for rotation in either direction and remains stationary. Upon slight movement of the vane 66, however, for example, in a clockwise direction in response to a decrease in furnace temperature from the desired value the illumination of photoelectric cell 59 is substantially increased whereupon the grid 50 is rendered less negative in potential with respect to its associated cathode 51 and consequently the conductivity of the triode section B is increased. This causes an increase in the energization of relay coil 20 and as a result the relay switch blade 25 is actuated into engagement with the contact 27 to thereby close the energizing circuit for motor field winding 15. The motor 9 is then operated for rotation in the direction to effect an opening adjustment of the fuel valve 3.

Upon slight movement of the vane 66 in the counter-clockwise direction in response to an increase in furnace temperature from the desired value, the illumination of the photoelectric cell 59 is substantially decreased, whereupon the grid 50 is rendered more negative in potential with respect to the cathode 51 to thereby reduce the conductivity of the triode section B. This effects a decrease in the energization of relay coil 20 and consequently actuation of the switch blade 25 into engagement with the contact 26 and thereby closure of the energizing circuit to motor field winding 16. The motor 9 is then actuated in the direction to produce a closing adjustment of the fuel valve 3. As noted hereinbefore, rotation of the motor 9 to effect a fuel valve adjustment also effects an adjustment of the follow-up potentiometer 17, 18.

It is noted that deflection of the galvanometer pointer 68 in the counter-clockwise direction of an amount to cause the vane 66 to move completely through the light beam and thereby permit illumination of photoelectric cell 59 even though the furnace temperature is higher than the desired value is prevented by the vane 66 striking against the tapering edge 70B of the casting 70.

In accordance with our present invention, adjustment of the follow-up potentiometer 17, 18 effects an adjustment of the plate 68 and lens 69 relatively to the lamp 67 and photoelectric cell 59. Such adjustment effects a transverse shift in the focal point of the light beam impinging on cell 59 relatively to the vane 66, and is in the proper direction, namely toward the left for the case under consideration to restore the illumination of cell 59 to that value which equalizes the conductivities of the triodes A and B and thereby restores the relay switch arm 25 to a point intermediate the contacts 26 and 27.

In this manner the valve 3 is modulated to an open or closed position in accordance with the decrease or increase respectively of the temperature within furnace 1.

To this end, the left end of the follow-up resistance 18 is connected in circuit with a relay 76 having a pair of opposed coils 77 and 78 and a balanced armature 79. The relay 76 is provided with a covering case 80 and is shown in detail in Fig. 4. Relay 76 may be of any well-known type, and for example, it may be of the type known commercially as "mousetrap" relays.

Armature 79 carries the plate 68, in which the lens 69 is mounted, and is pivoted for rotation at an intermediate point thereof on a shaft 81.

The relay 76 is mounted on the casting 70 in any convenient manner and is so arranged that, when deenergized, the lens 69 is in an intermediate position relative to the opening 70A in the casting 70. The diameter of the opening 70A is suitably proportioned relatively to the diameter of the lens 69 so as to permit a substantial transverse movement of the lens 69 while still maintaining it all within view of the photoelectric cell 59. The shield 68 is provided so as to prevent the passage of light from lamp 67 to cell 59 around the edges of lens 69 and is so proportioned that such leakage of light is not permitted even when the lens 69 is deflected to its extreme positions.

Armature 79 carries an iron core 82 at one end, which core is adapted to be moved into and out of the coil 77, and carries an iron core 83 at the other end, which core is adapted to be moved into and out of the coil 78. When the relay coils 77 and 78 are equally energized, the armature 79 will be maintained in a horizontal position by a spring 84 which is connected at its lower end to a lug 85 formed on the bottom of the relay case 80. The upper end of the spring 84 is connected to member 86 which is riveted to the underside of armature 79 at the intermediate portion thereof. The member 86 extends below the shaft 81 and is formed as shown in Fig. 4 to accomplish this end.

When one or the other of the relay coils 77 or 78 is energized to a greater extent than the other, the armature will be motivated in a counter-clockwise or clockwise direction accordingly to thereby shift the position of the lens 69 relatively to the opening 70A in the casting 70 and consequently to shift the focal point of the light beam directed at the photoelectric cell 59.

Electric power is supplied the relay 76 under control of the follow-up potentiometer 17, 18 from the transformer secondary winding through a circuit which may be traced from the right end terminal of winding 31 to a conductor 87, in which a resistance 88 adjustable by a knob 89 is inserted, to the contact 17 of the follow-up potentiometer. The left end of resistance 18, as seen in Fig. 1, is connected through an adjustable resistance 90 and the relay coil 77 to a conductor 76 and thereby to the left end terminal of the transformer secondary winding 31. The right end of resistance 18 is connected through an adjustable resistance 91 and the relay coil 78 to the conductor 76 and thereby to the left end terminal of winding 31. As shown, the resistances 90 and 91 are manually adjustable by manipulation of the knob 92. Rotation of the knob 92 in one direction operates to increase the amount of resistance 90 in circuit and to decrease the amount of resistance 91 in circuit, and conversely rotation of the knob 92 in the opposite direction operates to decrease the amount of resistance 90 in circuit and to increase the amount of resistance 91 in circuit.

By reason of the above construction, a true follow-up control system is provided. Upon an increase in temperature of furnace 1, the galvanometer pointer 68 and thereby the vane 66 are actuated in a counter-clockwise direction. Such movement of the vane 66 produces a sharp decrease in the illumination of photoelectric cell 59 and thereby causes the motor 9 to be actuated for rotation in the direction to effect a closing adjustment of the fuel valve 3. This operation of motor 9 also effects an adjustment of the contact 17 along the follow-up resistance 18 to the right, which adjustment produces an increase in the energization of relay coil 78 and a corresponding decrease in the energization of relay coil 77, whereupon armature 79 is given a rotational adjustment in the clockwise direction about its pivot point against the opposing force of spring 84. When the armature 79 has been rotated in the clockwise direction the precise amount to restore the illumination of photoelectric cell 59 to the value at which the triode sections A and B are equally conductive and consequently the relay coils 19 and 20 are equally energized, the motor 9 is deenergized for rotation and the system is stabilized. In this manner the fuel valve 3 is modulated toward a closed position in accordance with the amount of increase in furnace temperature. The operation of the system on a furnace temperature decrease and thereby on a clockwise movement of vane 66, is similar to that described above except that in this case, the motor 9 is actuated in the direction to give the fuel valve 3 an opening adjustment and the contact 17 an adjustment to the left along resistance 18. This effects a counter-clockwise adjustment of the armature 79, against the opposing force of the spring 84, of an amount sufficient to restore the illumination of the photoelectric cell 59 to the value at which the motor 9 is deenergized, thereby stabilizing the system. The valve 3 is thus modulated to an open position in accordance with the amount of decrease in furnace temperature.

The provision of the adjustable resistance 88 in the energizing circuit to the coils 77 and 78 of relay 76 permits adjustment of the throttling range of the system whereby the extent to which the fuel valve 3 is adjusted in response to a given change in furnace temperature may be varied. For example, upon an adjustment of resistance 88 decreasing the amount of said resistance in circuit, the voltage applied to the follow-up arrangement 10 will be increased whereby a smaller adjustment of the contact 17 along resistance 18 will be required to effect the follow-up actuation of relay 76 and lens 69 required to restore the illumination of photoelectric cell 59 to the value at which the motor 9 is deenergized for rotation. Accordingly a smaller fuel valve adjustment will be made for a given furnace temperature change. Conversely, on an adjustment of resistance 88 increasing the amount of said resistance in circuit, the voltage applied to the follow-up arrangement 10 will be decreased whereby a larger adjustment of the contact 17 along resistance 18 will be required to effect the required follow-up actuation of lens 69 needed to deenergize motor 9. With this adjustment of resistance 88, a larger fuel valve adjustment will be made for a given furnace temperature change. The knob 89 is provided in order to facilitate the adjustment of resistance 88.

The provision of the adjustable resistances 90 and 91 in the follow-up arrangement 10 permits a so-called "reset" adjustment of the system so that on a change in the operating condition of the furnace 1, for example, on a change in the load thereof, or on a change in the B. t. u. content of the fuel being supplied thereto, the tendency of said load change, fuel heating valve change, or other operating condition change, to increase or decrease the furnace temperature may be neutralized. As explained hereinbefore, the resistances 90 and 91 are adapted to be simultaneously adjusted in opposite directions by manipulation of the knob 92. Such manipulation of knob 92 operates to change the position of relay armature 79, and thereby the position of lens 69, for a given position of contact 17 along resistance 18, and thereby operates to change the relation between the position of the lens 69 and the adjustment of fuel valve 3 for a given furnace temperature value at which the motor 9 is not energized for rotation in either direction. Accordingly, on such manipulation, the motor 9 is energized for rotation to effect an adjustment of fuel valve 3 and an adjustment of contact 17 along resistance 18 as required to restore the lens 69 to the position in which the motor 9 is deenergized for rotation. Thus, the provision of resistances 90 and 91 permits load compensating or "reset" adjustments to be readily made.

As will be apparent to those skilled in the art, the provision of the adjustable resistances 88, 90 and 91 permits of a wide range of variation in the furnace operating characteristics thereby permitting a desirably good regulation under very different conditions of operation.

In Fig. 5 I have illustrated, more or less diagrammatically, a modification of the relay 76. As illustrated, the relay arrangement of Fig. 5 includes a U-shaped member 93 of magnetic material, on one leg of which a relay coil 77 is wound and on the other leg of which the relay coil 78 is wound. An elongated flexible member 94 is disposed between the legs of the member 93 and has one end rigid with the closed end of member 93, as seen in the drawings. The other end of member 94 extends between the open ends of member 93. When the relay coils 77 and 78 are equally energized the member 94 is intermediate the legs of member 93, but when one relay coil 77 or 78 is energized to a greater extent than the other, the flexible member 94 is deflected toward the leg of member 93 carrying that coil. The extent of deflection of member 94 is in accordance with the difference in energization of the relay coils 77 and 78. The plate 68 and lens 69 are mounted on the deflecting end of member 94 so that on the deflection of the latter, the plate 68 and lens 69 are given corresponding adjustments. This relay may be mounted in any suitable manner on the casting 70.

While in accordance with the provisions of the statutes, we have illustrated and described the best form of our invention now known to us, it will be apparent to those skilled in the art that changes may be made in the form of the apparatus disclosed without departing from the spirit of our invention as set forth in the appended claims, and that in some cases certain features of our invention may sometimes be used to advantage without a corresponding use of other features.

Having now described our invention, what we claim as new and desire to secure by Letters Patent is:

1. In a control system, a device to be adjusted in a plurality of positions for controlling the value of a variable condition, means to produce a path of radiant energy, means responsive to said radiant energy path, means responsive to changes in the magnitude of said condition, a device under control of said last mentioned means adapted to effect a control action of said radiant energy path and thereby adapted to control the actuation of said radiant energy responsive means, a power actuated device to position said first mentioned device, means controlled by said radiant energy responsive means to actuate said power actuated device in one direction upon actuation of said radiant energy responsive means in one sense and to actuate said power actuated device in the other direction upon actuation of said radiant energy responsive means in the opposite sense, and means mechanically independent of said radiant energy responsive means and operated by said power actuated device to an extent proportional to the magnitude of the control action on said radiant energy path produced by said second mentioned device to neutralize the effect of said control action on said radiant energy path whereby said first mentioned device is positioned proportionally to the change in magnitude of said condition.

2. In a control system, a device to be adjusted in a plurality of positions for controlling the value of variable condition, means to produce a path of radiant energy, means responsive to said radiant energy path, voltage producing means responsive to changes in the magnitude of said condition, a galvanometer under control of said last mentioned means adapted to effect a control action on said radiant energy path and thereby adapted to control the actuation of said radiant energy responsive means, a power actuated device to position said first mentioned device, means controlled by said radiant energy responsive means to actuate said power actuated device in one direction upon actuation of said radiant energy responsive means in one sense and to actuate said power actuated device in the other direction upon actuation of said radiant energy responsive means in the opposite sense, and means mechanically independent of said radiant energy responsive means and operated by said power actuated device to an extent proportional to the magnitude of the control action on said radiant energy path produced by said galvanometer to neutralize the effect of said control action on said radiant energy path whereby said first mentioned device is positioned proportionally to the change in magnitude of said condition.

3. In a control system, a device to be adjusted in a plurality of positions for controlling the value of a variable condition, means to produce a path of radiant energy, means responsive to said radiant energy path, means responsive to changes in magnitude of said condition, a device under control of said last mentioned means adapted to effect a control action on said radiant energy path and thereby adapted to control the actuation of said radiant energy responsive means, a reversible electrical motor to position said first mentioned device, means controlled by said radiant energy responsive means to selectively energize said reversible electrical motor for rotation in one direction or the other upon actuation of said radiant energy responsive means in one sense or in the opposite sense, and means mechanically independent of said radiant energy responsive means and operated by said reversible electrical motor to an extent proportional to the magnitude of the control action on said radiant energy path produced by said second mentioned device to neutralize the effect of said control action on said radiant energy path whereby said first mentioned device is positioned proportionally to the change in magnitude of said condition.

4. In a control system, a device to be adjusted in a plurality of positions for controlling the value of a variable condition, means to produce a path of radiant energy, means responsive to said radiant energy path, voltage producing means responsive to changes in the magnitude of said condition, a galvanometer under control of said last mentioned means adapted to effect a control action on said radiant energy path and thereby adapted to control the actuation of said radiant energy responsive means, a reversible electrical motor to position said first mentioned device, means controlled by said radiant energy responsive means to selectively energize said reversible electric motor for rotation in one direction or the other upon actuation of said radiant energy responsive means in one sense or in the opposite sense, and means mechanically independent of said radiant energy responsive means and operated by said reversible electric motor to an extent proportional to the magnitude of the control action on said radiant energy path produced by said galvanometer to neutralize the effect of said control action on said radiant energy path whereby said first mentioned device is positioned proportionally to the change in magnitude of said condition.

5. In a control system, a device to be adjusted in a plurality of positions for controlling the value of a variable condition, means to produce a path of radiant energy, means responsive to said radiant energy path, means responsive to changes in the magnitude of said condition, a device under control of said last mentioned means adapted to effect a control action on said radiant energy path and thereby adapted to control the actuation of said radiant energy responsive means, a power actuated device to position said first mentioned device, an electrical network controlled by said radiant energy responsive means to actuate said power actuated device in one direction upon actuation of said radiant energy responsive means in one sense and to actuate said power actuated device in the other direction upon actuation of said radiant energy responsive means in the opposite sense, and means mechanically independent of said radiant energy responsive means and operated by said power actuated device to an extent proportional to the magnitude of the control action on said radiant energy path produced by said second mentioned device to neutralize the effect of said control action on said radiant energy path whereby said first mentioned device is positioned proportionally to the change in magnitude of said condition.

6. In a control system, a device to be adjusted in a plurality of positions for controlling the value of a variable condition, means to produce a path of radiant energy, means responsive to said radiant energy path, voltage producing means responsive to changes in the magnitude of said condition, a galvanometer under control of said last mentioned means adapted to effect a control action on said radiant energy path and thereby adapted to control the actuation of said radiant energy responsive means, a power actuated device to position said first mentioned device, a normally stabilized electrical network which is adapted to be unstabilized under control of said radiant energy responsive means to actuate said power actuated device in one direction upon unstabilization thereof in one sense and to actuate said power actuated device in the other direction upon unstabilization thereof in the opposite sense and means mechanically independent of said radiant energy responsive means and operated by said reversible motor to an extent proportional to the magnitude of the control action on said radiant energy path produced by said galvanometer to neutralize the effect of said control action on said radiant energy path whereby said first mentioned device is positioned proportionally to the change of magnitude of said condition.

7. In a control system, a device to be adjusted in a plurality of positions for controlling the value of a variable condition, means to produce a path of radiant energy, means responsive to said radiant energy path, voltage producing means responsive to changes in the magnitude of said condition, a galvanometer under control of said last mentioned means adapted to effect a control action on said radiant energy path and thereby adapted to control the actuation of said radiant energy responsive means, a reversible electrical motor to position said first mentioned device, a normally stabilized electrical network which is adapted to be unstabilized under control of said radiant energy responsive means to selectively energize said reversible electrical motor for rotation in one direction or the other upon unstabilization thereof in one sense or in the opposite sense, and means mechanically independent of said radiant energy responsive means and operated by said reversible motor to an extent proportional to the magnitude of the control action on said radiant energy path produced by said galvanometer to neutralize the effect of said control action on said radiant energy path whereby said first mentioned device is positioned proportionally to the change of magnitude of said condition.

8. In a control system, a device to be adjusted in a plurality of positions for controlling the value of a variable condition, means to produce a path of radiant energy, means responsive to said radiant energy path, means responsive to changes in the magnitude of said condition, a deflectable member disposed in the path of said radiant energy and adapted to control the radiant energy impinging on said radiant energy responsive means in accordance with the position thereof relatively to said radiant energy path, a device under control of said condition responsive means to vary the relative positions of said deflectable member and said radiant energy path, a power actuated device to position said first mentioned device, means controlled by said radiant energy responsive means to actuate said power actuated device in one direction upon actuation of said radiant energy responsive means in one sense and to actuate said power actuated device in the other direction upon actuation of said radiant energy responsive means in the opposite sense, and means operated by said power actuated device to an extent proportional to the magnitude of the control effect on said radiant energy path produced by said deflectable member to restore the original relative postions of said deflectable member and said radiant energy path to thereby neutralize the effect of the control action on said radiant energy responsive means effected by said second mentioned device whereby said first mentioned device is positioned proportionally to the change in magnitude of said condition.

9. In a control system, a device to be adjusted in a plurality of positions for controlling the value of a variable condition, means to produce a path of radiant energy, means responsive to said radiant energy path, voltage producing means responsive to changes in the magnitude of said condition, a deflectable member disposed in the path of said radiant energy and adapted to control the radiant energy impinging on said radiant energy responsive means in accordance with the position thereof relatively to said radiant energy path, a galvanometer under control of said condition responsive means to vary the relative positions of said deflectable member and said radiant energy path, a power actuated device to position said first mentioned device, means controlled by said radiant energy responsive means to actuate said power actuated device in one direction upon actuation of said radiant energy responsive means in one sense and to actuate said power actuated device in the other direction upon actuation of said radiant energy responsive means in the opposite sense, and means operated by said power actuated device to an extent proportional to the magnitude of the control effect on said radiant energy path produced by said deflectable member to restore the original relative positions of said deflectable member and said radiant energy path to thereby neutralize the effect of the control action on said radiant energy responsive means effected by said galvanometer whereby said first mentioned device is positioned proportionally to the change in magnitude of said condition.

10. In a control system, a device to be adjusted in a plurality of positions for controlling the value of a variable condition, means to produce a path of radiant energy, means responsive to said radiant energy path, voltage producing means responsive to changes in the magnitude of said condition, a deflectable member disposed in the path of said radiant energy and adapted to control the radiant energy impinging on said radiant energy responsive means in accordance with the position thereof relatively to said radiant energy path, a galvanometer under control of said condition responsive means to vary the relative positions of said deflectable member and said radiant energy path, a reversible electrical motor to position said first mentioned device, a normally stabilized electrical network adapted to be unstabilized under control of said radiant energy responsive means and adapted when unstabilized in one sense to actuate said reversible electrical motor in one direction and adapted when unstabilized in the opposite sense to actuate said reversible electrical motor in the other direction, and means operated by said reversible electrical motor to an extent proportional to the magnitude of the control effect on said radiant energy path produced by said deflectable member to restore the original relative positions of said deflectable member and said radiant energy path to thereby neutralize the effect of the control action on said radiant energy responsive means effected by said galvanometer whereby said first mentioned device is positioned proportionally to the change in magnitude of said condition.

11. In a control system, a device to be adjusted in a plurality of positions for controlling the value of a variable condition, means to produce a path of radiant energy, means responsive to said radiant energy path, means responsive to changes in the magnitude of said condition, a deflectable member disposed in the path of said radiant energy and adapted to control the radiant energy impinging on said radiant energy responsive means in accordance with the position thereof relatively to said radiant energy path, a device under control of said condition responsive means to vary the relative positions of said deflectable member and said radiant energy path, a power actuated device to position said first mentioned device, means controlled by said radiant energy responsive means to actuate said power actuated device in one direction upon actuation of said radiant energy responsive means in one sense and to actuate said power actuated device in the other direction upon actuation of said radiant energy responsive means in the opposite sense, an electrical network adapted to be adjusted by said power actuated device, and means controlled by said electrical network to restore the original relative positions of said deflectable member and said radiant energy path to thereby neutralize the effect of the control action on said radiant energy responsive means effected by said second mentioned device whereby said first mentioned device is positioned proportionally to the change in magnitude of said condition.

12. In a control system, a device to be adjusted in a plurality of positions for controlling the value of a variable condition, means to produce a path of radiant energy, means responsive to said radiant energy path, means responsive to changes in the magnitude of said condition, a deflectable member disposed in the path of said radiant energy and adapted to control the radiant energy impinging on said radiant energy responsive means in accordance with the position thereof relatively to said radiant energy path, a device under control of said condition responsive means to vary the relative positions of said deflectable member and said radiant energy path, a power actuated device to position said first mentioned device, means controlled by said radiant energy responsive means to actuate said power actuated device in one direction upon actuation of said radiant energy responsive means in one sense and to actuate said power actuated device in the other direction upon actuation of said radiant energy responsive means in the opposite sense, an electrical network adapted to be adjusted by said power actuated device, means controlled by said electrical network to restore the original relative positions of said deflectable member and said radiant energy path to thereby neutralize the effect of the control action on said radiant energy responsive means effected by said second mentioned device whereby said first mentioned device is positioned proportionally to the change in magnitude of said condition, and means to adjust said electrical network to vary the effect on said electrical network of a given adjustment thereof by said power actuated device.

13. In a control system, a device to be adjusted in a plurality of positions for controlling the value of a variable condition, means to produce a path of radiant energy, means responsive to said radiant energy path, voltage producing means responsive to changes in the magnitude of said condition, a deflectable member disposed in the path of said radiant energy and adapted to control the radiant energy impinging on said radiant energy responsive means in accordance with the position thereof relatively to said radiant energy path, a galvanometer under control of said condition responsive means to vary the relative positions of said deflectable member and said radiant energy path, a reversible electrical motor to position said first mentioned device, means controlled by said radiant energy responsive means to actuate said reversible electrical motor in one direction upon actuation of said radiant energy responsive means in one sense and to actuate said reversible electrical motor in the other direction upon actuation of said radiant energy responsive means in the opposite sense, an electrical network adapted to be adjusted by said reversible motor, means controlled by said electrical network to restore the original relative positions of said deflectable member and said radiant energy path to thereby neutralize the effect of the control action on said radiant energy responsive means effected by said galvanometer whereby said first mentioned device is positioned proportionally to the change in magnitude of said condition, and means to adjust said electrical network to vary the effect on said electrical network of a given adjustment thereof by said motor.

14. In a control system, a device to be adjusted in a plurality of positions for controlling the value of a variable condition, means to produce a path of radiant energy, means responsive to said radiant energy path, means responsive to changes in the magnitude of said condition, a deflectable member disposed in the path of said radiant energy and adapted to control the radiant energy impinging on said radiant energy responsive means in accordance with the position thereof relatively to said radiant energy path, a device under control of said condition responsive means to vary the relative positions of said deflectable member and said radiant energy path, a power actuated device to position said first mentioned device, means controlled by said radiant energy responsive means to actuate said power actuated device in one direction upon actuation of said radiant energy responsive means in one sense and to actuate said power actuated device in the other direction upon actuation of said radiant energy responsive means in the opposite sense, an electrical network adapted to be adjusted by said power actuated device, means controlled by said electrical network to restore the original relative positions of said deflectable member and said radiant energy path to thereby neutralize the effect of the control action on said radiant energy responsive means effected by said second mentioned device whereby said first mentioned device is positioned proportionally to the change in magnitude of said condition, and means to adjust said electrical network to vary the control of said controlled means by said electrical network.

15. In a control system, a device to be adjusted in a plurality of positions for controlling the value of a variable condition, means to produce a path of radiant energy, means responsive to said radiant energy path, voltage producing means responsive to changes in the magnitude of said condition, a deflectable member disposed in the path of said radiant energy and adapted to control the radiant energy impinging on said radiant energy responsive means in accordance with the position thereof relatively to said radiant energy path, a galvanometer under control of said condition responsive means to vary the relative positions of said deflectable member and said radiant energy path, a reversible electrical motor to position said first mentioned device, means controlled by said radiant energy responsive means to actuate said reversible electrical motor in one direction upon actuation of said radiant energy responsive means in one sense and to actuate said reversible electrical motor in the other direction upon actuation of said radiant energy responsive means in the opposite sense, an electrical network adapted to be adjusted by said reversible electrical motor, means controlled by said electrical network to restore the original relative positions of said deflectable member and said radiant energy path to thereby neutralize the effect of the control action on said radiant energy responsive means effected by said galvanometer whereby said first mentioned device is positioned proportionally to the change in magnitude of said condition, and means to adjust said electrical network to vary the control of said controlled means by said electrical network.

16. In a control system, a device to be adjusted in a plurality of positions for controlling the value of a variable condition, means to produce a path of radiant energy, means responsive to said radiant energy path, means responsive to changes in the magnitude of said condition, a deflectable member disposed in the path of said radiant energy and adapted to control the radiant energy impinging on said radiant energy responsive means in accordance with the position thereof relatively to said radiant energy path, a device under control of said condition responsive means to vary the relative positions of said deflectable member and said radiant energy path, a power actuated device to position said first mentioned device, means controlled by said radiant energy responsive means to actuate said power actuated device in one direction upon actuation of said radiant energy responsive means in one sense and to actuate said power actuated device in the other direction upon actuation of said radiant energy responsive means in the opposite sense, an electrical network adapted to be adjusted by said power actuated device, differential relay means controlled by said electrical network to restore the original relative positions of said deflectable member and said radiant energy path to thereby neutralize the effect of the control action on said radiant energy responsive means effected by said second mentioned device whereby said first mentioned device is positioned proportionally to the change in magnitude of said condition, impedance means connected in said network and adapted to be adjusted to vary the control of said differential relay means by said electrical network, and other impedance means connected in said network and adapted to be adjusted to vary the effect on said electrical network of a given adjustment thereof by said power actuated device.

17. In a control system, a device to be adjusted in a plurality of positions for controlling the value of a variable condition, means to produce a light beam, a light sensitive device responsive to said light beam, means responsive to changes in the magnitude of said condition, a deflectable member disposed in the path of said light beam and adapted to control the illumination of said light sensitive device in accordance with the position thereof relatively to said light beam, a device under control of said condition responsive means to vary the relative positions of said deflectable member and said light beam, a power actuated device to position said first mentioned device, means controlled by said light sensitive device to actuate said power actuated device in one direction upon an increase in the illumination thereof from a predetermined value and to actuate said power actuated device in the other direction upon a decrease in the illumination of said light sensitive device from said predetermined value, and means operated by said power actuated device to an extent proportional to the magnitude of the control effect on said light beam produced by said deflectable member to restore the original relative positions of said deflectable member and said light beam to thereby neutralize the effect of the control action on said light sensitive device effected by said third mentioned device whereby said first mentioned device is positioned proportionally to the change in magnitude of said condition.

18. In a control system, a device to be adjusted in a plurality of positions for controlling the value of a variable condition, means to produce a beam of light, a light sensitive device adapted to be illuminated by said light beam, means responsive to changes in the magnitude of said condition, a device under control of said last mentioned means adapted to effect a control action on said light beam and thereby adapted to control the illumination of said light sensitive device, a power actuated device to position said first mentioned device, means controlled by said light sensitive device to actuate said power actuated device in one direction upon an increase in illumination of said light sensitive device from a predetermined value and to actuate said power actuated device in the other direction upon a decrease in the illumination of said light sensitive device from said predetermined value, and means mechanically independent of said light sensitive device operated by said power actuated device to an extent proportional to the magnitude of the control action on said light beam produced by said third mentioned device to neutralize the effect of said control action on said light beam whereby said first mentioned device is positioned proportionally to the change in magnitude of said condition.

19. In a control system, a device to be adjusted in a plurality of positions for controlling the value of a variable condition, means to produce a light beam, a light sensitive device adapted to be illuminated by said light beam, voltage producing means responsive to changes in the magnitude of said condition, a galvanometer under control of said last mentioned means adapted to effect a control action on said light beam and thereby adapted to control the illumination of said light sensitive device, a reversible electrical motor to position said first mentioned device, a normally stabilized electrical network which is adapted to be unstabilized under control of said light sensitive device to selectively energize said reversible electrical motor for rotation in one direction or the other upon unstabilization thereof in one sense or in the opposite sense, and means mechanically independent of said light sensitive device operated by said reversible motor to an extent proportional to the magnitude of the control action on said light beam produced by said galvanometer to neutralize the effect of said control action on said light beam whereby said first mentioned device is positioned proportionally to the change of magnitude of said condition.

ROSCOE D. BEAN.
HARRY S. JONES.